United States Patent

[11] 3,626,220

| [72] | Inventor | Eugen Niculescu<br>Bucharest, Romania |
|---|---|---|
| [21] | Appl. No. | 28,418 |
| [22] | Filed | Apr. 14, 1970 |
| [45] | Patented | Dec. 7, 1971 |
| [73] | Assignee | Uzina de Masini Electrice Bucuresti<br>Bucharest, Romania |
| [32] | Priority | Apr. 18, 1969 |
| [33] | | Romania |
| [31] | | 59771 |

[54] ELECTRIC MOTOR WITH BRAKE
6 Claims, 5 Drawing Figs.

[52] U.S. Cl. ................................... 310/77,
188/163, 192/18 B, 310/93
[51] Int. Cl. ....................................... H02k 7/10
[50] Field of Search .......................... 310/67, 92,
76, 93, 77, 94; 188/163; 192/18 B

[56] References Cited
UNITED STATES PATENTS

| 2,480,291 | 8/1949 | Gerentes | 310/77 |
| 2,677,256 | 5/1954 | Donandt | 310/77 X |
| 2,694,781 | 11/1954 | Hinz | 310/77 |
| 3,032,667 | 5/1962 | Sorchy | 310/77 |

FOREIGN PATENTS

| 1,157,272 | 7/1969 | Great Britain | 310/77 |
| 1,048,668 | 12/1953 | France | 310/77 |

Primary Examiner—D. F. Duggan
Assistant Examiner—Mark O. Budd
Attorney—Arthur O. Klein ABSTRACT: Electric motor consisting of a stator, a cylindrical rotor and a brake. Both the stator and the rotor are provided with windings and are in functional relation one to another. The rotor may turn inside the stator being separated from it by a small airgap.

The rotor consists of two concentric parts, that is, a central conical core, without winding and an outer crown, including the rotor winding, and having an inner hollow of the same conicity as the central core, the central core entering and filling the inner hollow.

One of the two rotor parts is fixed and the other one is free for a small axial shifting with respect to the first one, the other part being also fixedly attached to the brake movable part.

When the motor is not connected to the supply, it is braked, a small inner airgap $\delta'$ being thus formed between the two rotor parts. When the motor is connected to the supply, the two rotor parts are brought into contact, the brake is unlocked, and the motor operates as a normal motor.

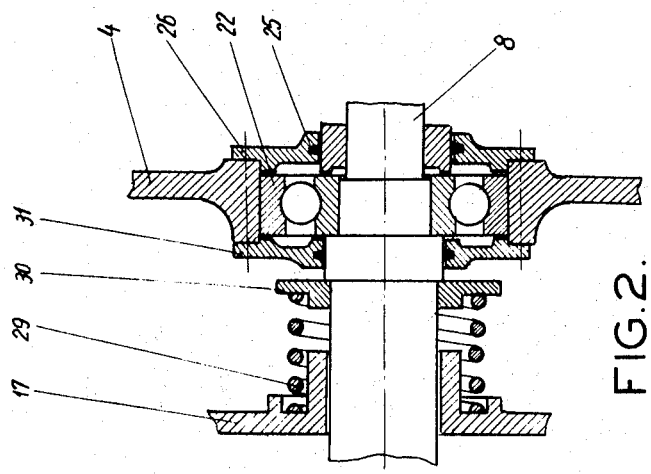
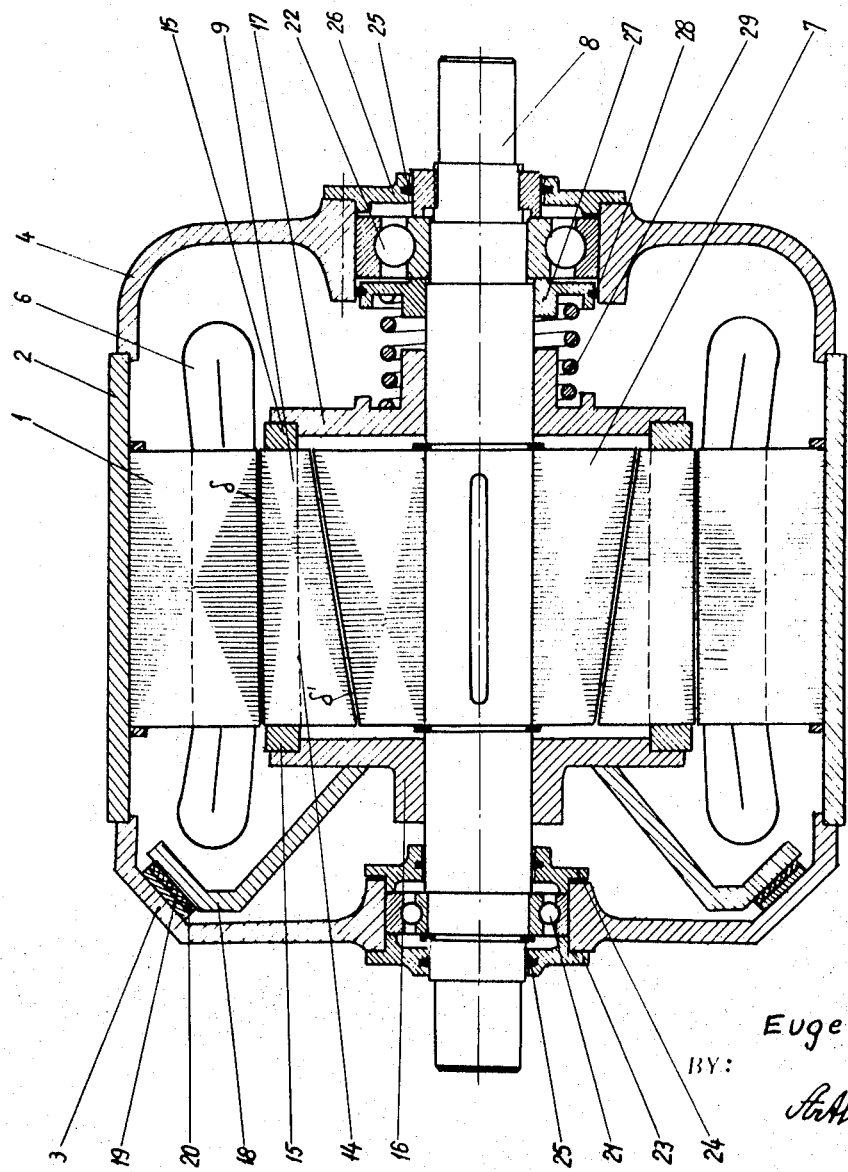

PATENTED DEC 7 1971

INVENTOR:
Eugen NICULESCU

BY:
Arthur O. Klein
ATTORNEY

ELECTRIC MOTOR WITH BRAKE

The invention relates to an electric motor including a brake the motor functioning in such manner that when the motor is not connected to the electrical supply it is braked and cannot be turned, even if the rotor is subjected to very substantial torque from an outer source. On the contrary, when the motor is connected to the power supply, the brake is unlocked and the motor operates as a normal one. This type of motor is indispensable for crane operation, lift operation and generally for the driving of any lifting or carrying machine. These motors are also frequently used to drive tool-machines as well as for many other uses.

The best known prior art motor of this type is an absolutely normal asynchronous induction motor coupled to an electric-brake in one-frame construction. This is a complicated construction, as the electric brake has his own electromagnetic system. Consequently, this prior art motor is an expensive mechanism and presents poor security in operation.

Another well-known prior mechanism is the induction motor with a conical rotor. For these motors, the airgap between the stator and the rotor is limited by conical surfaces having the same concentricity, that is, the rotor outer surface and the stator inner surface. The rotor is provided to have a small axial translation movement and it is fixedly secured to the brake movable part. When the motor is disconnected, the conical rotor is shifted, thus increasing the airgap, and the brake is locked. When the motor is connected to a source of electric power, the rotor is attracted inside the stator, the brake is unlocked and the motor may operate as a normal motor. These motors present the disadvantage of a complicated construction that is difficult to be manufactured from the technological point of view; the overall dimensions are increased, as the magnetic circuit is not correctly used and the slot space, where the coils are placed, is decreased. The rotor has a translation movement together with the shaft and the support of the rotor, on ball bearings is complicated and expensive; the driving pinion located on the shaftend must be exclusively provided with straight teeth allowing the rotor axial movement together with the shaft, a design that is not always convenient. In addition, the starting of these motors is hampered by the fact that an increased airgap exists when starting between the windings in interaction.

Knowledge also exists of induction motors provided with a field deviation device, having the stator longer than the rotor and the rotor provided at one of its ends with a magnetic field deviation device, that axially orients part of the magnetic flux towards the brake armature. This presents the disadvantage of incomplete use of the electromagnetic circuit, as the rotor is shorter. In addition, this type of motor generates small braking forces.

The object of the present invention is to achieve an included brake motor avoiding the disadvantages of the known constructions.

The basic idea of the present invention is to separate from a magnetic point of view one of the two parts of the electrical machine, that is, the stator or, as an alternative, the rotor. As the solution to magnetically separate the rotor in two parts is more advantageous, only this solution will be further presented.

Briefly, the electric motor corresponding to the present invention is provided with a rotor consisting of two concentric parts, that is, a conical central core, having no winding, and an outer crown, having a winding and an inner hole adapted to the core, so that when in operation, the central core may be perfectly included in the crown and the motor is almost identical to a normal motor.

The present invention may of course, be applied to any type of electrical motor, either for mono or multiphase AC or for DC as is shown in the subsequent description.

There follows, in connection with the annexed drawings, the description of an example of construction of an included brake squirrel-cage induction motor in accordance with the invention, that represents a case that is most frequently met in practice.

BRIEF DESCRIPTION OF THE DRAWINGS

FIG. 1 represents a longitudinal section through the squirrel-cage electric induction motor in the embodiment which is most frequently used, with the central core extended on the whole rotor length.

FIG. 2 represents a detail of the support for the spring of the brake of the motor in accordance with the invention shown in FIG. 1.

(In FIG. 3 and 4, for economy of illustration the stator and rotor windings are shown located only in a part of the stator and rotor slots.)

Figure 3:
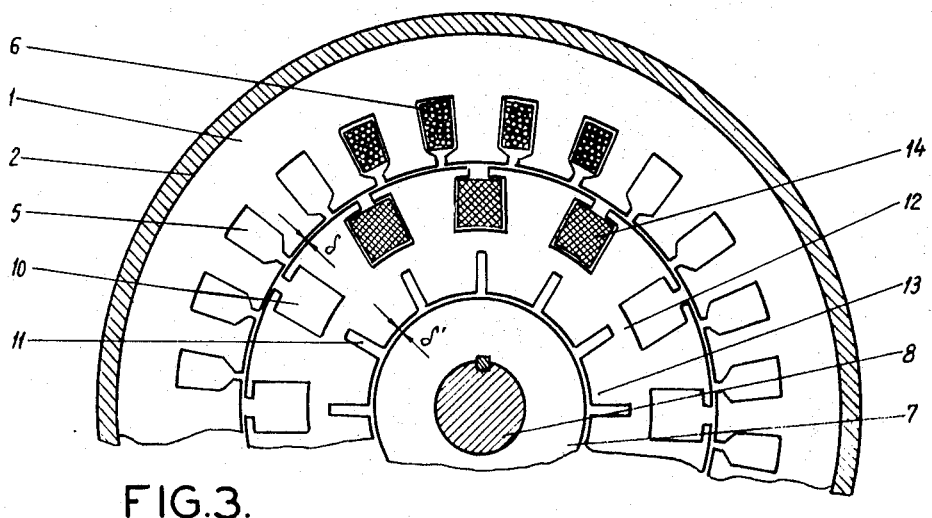
FIG. 3 represents a cross section of the same motor clearly showing the form of the motor stator and rotor laminations.

The electric motor in accordance with FIG. 1 and 2 consists of a stator core (1) made of magnetic laminations fixed in a frame (2) and in the fixed end closure members (3) and (4), so that the stator is fixed in the space.

The stator is provided with slots (5) containing the stator winding (6) supplied from the power supply.

For the sake of convenience, the power supply and the connections from such supply to the motor have not been represented on the drawing.

Inside the stator, a cylindrical rotor may turn so that a small airgap $\delta'$ is provided between the stator and the rotor.

The rotor in its turn consists of two concentric parts separated by a conical surface and a supplementary airgap $\delta'$ that is,:

a central core (7) consisting of laminations, solidly and fixedly mounted on shaft (8) and having an outer conical shape;

an outer crown (9) also consisting of laminations and having inside thereof a cavity with the same conicity as the central core (7).

Crown (9) is provided on its outer periphery with slots (10) that are uniformly distributed, and where the rotor winding is introduced and inside, on the whole circumference, with empty slots (11) that drive the magnetic flux towards the central core (7). For these slots to be effective, their bottom should be as near the bottom of the coiled slots (10), as the mechanical considerations allow.

The iron thickness (12) between the slots (10) and (11) bottoms being small, it is quickly saturated and the magnetic flux is obliged to pass towards core (7) through teeth (13) between slots (11). The width of these slots should be sufficient to prevent the magnetic flux from returning by crossing these slots.

Further (14) represents the squirrel-cage rotor winding longitudinal bars, each bar being welded at both ends to a short-circuiting ring (15). Of course, the rotor cage may be cast of one piece with short-circuiting rings.

The crown (9) is fixed on shaft (8) my means of the supporting parts (16) and (17), so that it cannot turn with respect to shaft (7), on which it may slide axially, as necessary, as shown below.

The supporting part (16) is fixed to the movable part (18) of the brake. The fixed part (19) of the brake is rigidly connected to one of the fixed brackets (3) or (4) or to the frame (2); here it is connected to bracket (3).

Between the fixed part (19) of the brake and its movable part (18), a wear material (20) is usually introduced, this simultaneously increasing the friction coefficient.

The rotor and shaft together turn in brackets (3) and (4) by means of the ball bearings (21), (22) respectively, the bearing (21) being of quite normal construction and grease sealed by means of the outer sealing cover (23) and the inner sealing cover (24), which does not allow the lubricant to escape from the ball bearing due to felt rings (25).

The outer sealing cover (26) at the bearing (22) is of similar construction. The inner sealing cover (27) at the bearing (22) is a bit different from the other covers (23) (24), (26). This is rigidly mounted on the shaft and the sealing is effected at its outer periphery by means of a felt ring (28). Thus the sealing cover (27) turns simultaneously with the shaft and is unlike the sealing covers (23), (24), (26) which are fixed.

A spring (29) located between the cover (27) and the support part (17) permanently pushes crown (9) including the movable part (18) of the brake towards its fixed part (19), thus keeping the rotor locked as long as the motor is not connected to the electrical power supply.

When the motor is connected to the supply a magnetic flux appears, that, as shown, is closed through the central core (7) and exerts an attraction force upon it. The force of spring (29) is overcome, airgap δ' decreases towards zero, the brake is unlocked and the motor may start and operate under normal conditions.

It is easy to see that in its normal operation, the motor according to the invention is not at all different from a common induction motor having a cylindrical rotor with normal airgap δ' and has all the characteristics and advantages of such a motor.

Of course, the bearing and sealing construction in connection with the spring (29) support, as shown above, is not limiting since the problem may be solved in other manners. FIG. 2 shows a way of supporting the spring that is even more simple than that of FIG. 1. According to this solution, spring (29) is supported on a part (30) fixedly secured to the shaft, so that both motor bearings are quite normal, all the sealing covers being in their turn normally fixed in space, including cover (31) which replaces cover (27). The support for the spring in accordance with FIG. 2 requires a little more space than the corresponding arrangement shown in FIG. 1.

In certain cases, the rotor crown (9) lamination may be simplified, that is, it may be made without the empty slots (11). That is why part of the magnetic flux is partially closed by the crown (9) and yoke (32) (FIG. 4) is made without inner slots; only part of this flux enters core (7).

The attraction force exerted on core 7 is smaller. By correctly dimensioning the height of yoke (32) so that it may be saturated, and by correctly choosing the core conicity, this disadvantage may be diminished and the simplified solution shown in FIG. 4 may be more convenient and even cheaper.

In accordance with another variant, core (7) is hot made of laminations but is made of an integral piece of iron; it is therefore quite simply made.

It is known that the magnetic flux in the rotor yoke of an induction motor has in operation a quite low frequency, so that the arrangement with a core (7) made of a solid piece of iron is convenient in many cases.

Figure 5:
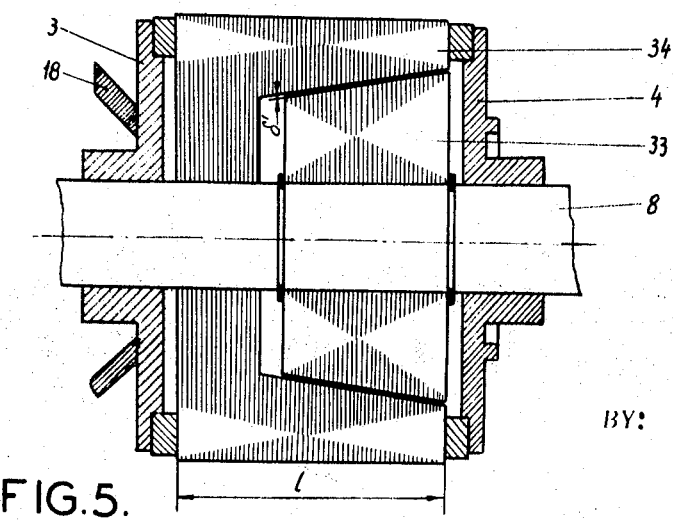
FIG. 5 represents a longitudinal section through a third embodiment of the motor in accordance with the invention, this being achieved in a variant with the central conical core axially shorter than the laminations of the rotor core.

FIG. 5 shows a variant of the motor in accordance with the invention where the central core (33), is shorter than the rotor lengths. For convenience, this figure shows the rotor only. The rest of the motor is identical with that shown in FIG. 1.

Figure 4:
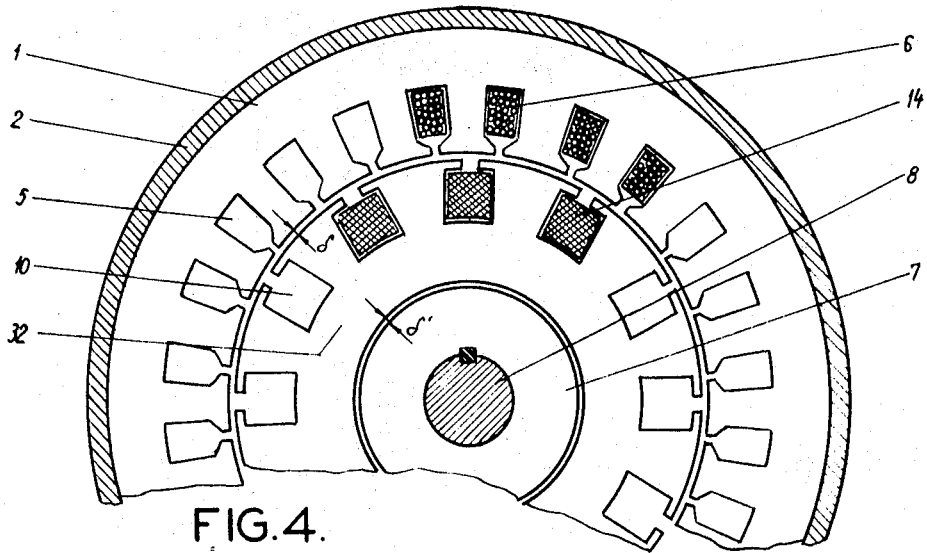
FIG. 4 represents a cross section through another type of motor in accordance with the invention, where the rotor lamination is somewhat different from that of the embodiment in FIG. 2.

The motor rotor laminations in the variant shown in FIG. 5 may be provided with inner slots (11), as in FIG. 3, or without these slots, as in FIG. 4; also, in the arrangement shown in FIG. 5 part of the crown (9) laminations may be provided with inner slots (11) and the other part made without slots. The rotor crown in FIG. 5 is designated (34).

Part of the laminations of crown (9) of FIG. 1 may be provided with empty slots (11), the other part of such laminations being made without these slots.

The included brake motor, in accordance with the invention, presents the following advantages:

simple construction that may be easily obtained from the technological point of view, almost as any normal machine;

the airgap between the stator and rotor is constant, irrespective of whether the motor is braked or is in operation, and it is maintained constant irrespective of brake wear;

the magnetic circuit is used in an optimum manner as a result of the fact that the teeth and yokes have the same dimensions all along the laminations core;

the ball bearing system is a simple one, the same as for a normal motor.

Although the invention is illustrated and described with reference to a plurality of preferred embodiments thereof, it is to be expressly understood that it is in no way limited to the disclosure of such plurality of embodiments, but is capable of numerous modifications within the scope of the appended claims.

I claim:

1. In an electric motor having a built-in brake, and including a wound stator having an inner cylindrical surface, a motor shaft journaled coaxially of the stator, a rotor mounted on the motor shaft and having an outer cylindrical surface, there being a narrow annular gap between the confronting surfaces of the stator and rotor, the rotor being divided along at least a substantial portion of its axial length into two coaxial parts, a first one of said parts being a central core having an outer conical surface, the second one of said parts being an outer crown uniformly slotted on its outer surface in that portion thereof that covers the first part, the crown having an inner conical surface of the same conicity as the outer surface of the central core, between the conical surfaces of the two rotor parts there being an inner airgap; one of the two rotor parts being rigidly fixed on the motor shaft against turning with respect thereto but being axially shiftable with respect thereto, the brake having one friction part fixed with respect to the stator, and another friction part cooperating with the one friction part and connected to the said other part of the rotor, the improvement which comprises: the outer crown of the rotor being uniformly slotted outside and inside, the iron thickness between the bottoms of the two slots being as small as possible, the outside slots of the crown having approximately square form in order to minimize the leakage flux, the width of the inner slots being sufficient to prevent the magnetic flux from returning by crossing the inner slots, the crown being fixed on the motor shaft by two supports which are separated from the rotor core by an airgap wide enough so that a loss of the motor flux is reduced practically to zero and so that the most part of the active magnetic flux is obliged to close through the central core to produce the maximum braking force when the motor is supplied with electric current and the brake is free, and means to shift said other part of the rotor and said other friction part axially of the motor shaft to brake the motor when the motor is not supplied with electric current.

2. An electric motor according to claim 1, wherein the rotor is divided into said first and second parts throughout all of its axial length.

3. An electric motor according to claim 1, wherein the supports of the rotor outer crown are of iron, said supports being separated from the rotor core by an airgap, said airgap being wide enough so that loss of the motor flux therethrough is reduced to zero.

4. An electric motor according to claim 1, wherein the outer slots of the motor crown contain electrically conducting windings.

5. An electric motor according to claim 1, wherein the rotor is a squirrel-cage rotor, the outer slots of the crown being filled with electrically conducting metal cast together with short-circuiting rings for the motor.

6. An electric motor according to claim 1, wherein the inner core part of the rotor is made of a solid piece of ferromagnetic metal.

* * * * *